United States Patent
Odland et al.

(10) Patent No.: US 8,982,150 B2
(45) Date of Patent: *Mar. 17, 2015

(54) CUSTOMIZED ADVERTISING ON FOOTWEAR

(71) Applicants: David Odland, Scottsdale, AZ (US); Kathryn Odland, Scottsdale, AZ (US)

(72) Inventors: David Odland, Scottsdale, AZ (US); Kathryn Odland, Scottsdale, AZ (US)

( * ) Notice: Subject to any disclaimer, the term of this patent is extended or adjusted under 35 U.S.C. 154(b) by 78 days.

This patent is subject to a terminal disclaimer.

(21) Appl. No.: 13/792,161

(22) Filed: Mar. 10, 2013

(65) Prior Publication Data
US 2014/0025447 A1    Jan. 23, 2014

Related U.S. Application Data

(63) Continuation of application No. 12/465,593, filed on May 13, 2009, now Pat. No. 8,421,822.

(51) Int. Cl.
| | |
|---|---|
| G09G 5/00 | (2006.01) |
| G06Q 30/02 | (2012.01) |
| A43B 1/00 | (2006.01) |
| A43B 3/00 | (2006.01) |
| A43B 3/24 | (2006.01) |
| H04N 5/64 | (2006.01) |
| A43B 23/24 | (2006.01) |

(52) U.S. Cl.
CPC .......... *G06Q 30/0241* (2013.01); *A43B 1/0027* (2013.01); *A43B 3/00* (2013.01); *A43B 3/0005* (2013.01); *A43B 3/24* (2013.01); *H04N 5/64* (2013.01); *A43B 23/24* (2013.01)
USPC ............... 345/619; 36/136; 36/137; 705/14.4

(58) Field of Classification Search
USPC ..................... 345/619; 36/137, 136; 705/14.4
See application file for complete search history.

(56) References Cited

U.S. PATENT DOCUMENTS

| | | | | |
|---|---|---|---|---|
| 5,813,148 | A * | 9/1998 | Guerra | 36/137 |
| 6,265,984 | B1 * | 7/2001 | Molinaroli | 340/815.4 |
| 6,511,198 | B1 * | 1/2003 | Erickson | 362/103 |
| 8,421,822 | B2 * | 4/2013 | Odland et al. | 345/619 |
| 2002/0019296 | A1 * | 2/2002 | Freeman et al. | 482/4 |
| 2004/0187184 | A1 * | 9/2004 | Rubin et al. | 2/69 |
| 2004/0201489 | A1 * | 10/2004 | Levinsohn | 340/691.6 |

* cited by examiner

*Primary Examiner* — Maurice L McDowell, Jr.

(57) ABSTRACT

A system for advertising on footwear by displaying promotional content on an electronic display of the footwear and wherein the promotional content being displayed occupies 25% to 100% of the outer surface of the footwear. Additionally, the content can be displayed according to a plurality of conditions including time of day, rate of motion of the footwear and environmental lighting conditional around the footwear.

20 Claims, 13 Drawing Sheets

CUSTOMIZED ADVERTISING ON FOOTWEAR

CROSS-REFERENCE TO RELATED APPLICATION

This application is a continuation of U.S. patent application Ser. No. 12/465,593, filed May, 13, 2009, the disclosure of which is incorporated herein by reference for any and all purposes.

FIELD OF THE INVENTION

The present invention generally relates to customizing the look of footwear to a user's preferences and more particularly to a system for electronically tailoring the look of the footwear by the user.

BACKGROUND OF THE INVENTION

Customization of products and services allows an individual to personalize an item to reflect a plethora of different moods, preferences, personalities, feelings, information, likes, dislikes, etc. Footwear is an area in which people are often very particular and their footwear often serve as a sign of self-expression, style, functionality, individuality and a variety of other purposes. Currently, many footwear manufactures use internal or external designers to produce new looks for their footwear. Some even perform marketing trials and tests to determine which styles may sell the best in order to maximize their investments. In order to account for the plethora of different styles, a manufacturer needs to produce a variety of different footwear styles in order to appease all the different tastes of users. This increases costs to the manufacturer and reduced profitability. In addition, users of the footwear may not like the majority of footwear available and/or may wish that there were minor style differences to the existing footwear to better fit their tastes.

In the past, there have been some attempts to illuminate small portions of footwear with LEDs, giving user's some footwear customization as well as limited customization. In the past, footwear may include illuminated phosphors or LED's in random patterns that are located only in small areas of the footwear and at very low resolutions, wherein users may select a desired illumination sequence from a limited set of preprogrammed sequences. Although the low resolution pixels may change color or flash sequence, they do not covering a large or majority portion of the shoe, are not high resolution or provide for a large number of color variations. In addition, the designs and patterns are not customizable so the user can have a wide variety of options for what is displayed.

There have been recent developments in display technologies, including by way of example Liquid Crystal Displays (LCDs), Digital Light Projectors (DLPs) and the like. One particular recent display technology is Organic Light Emitting Diode (OLED) technology. OLED displays comprise LED's having an emissive electroluminescent layer that is made up of organic compounds. These OLED displays are low-powered, light-weight, flexible and allow for high-resolution design display. One reason for the reduced power is that OLED displays do not utilize a backlight and the displays can be made very thin (fractions of millimeters thick).

Presently, there is no way for the users or manufacturers of footwear to customize their footwear to display different high resolution designs in a quick and easy manner nor is there a way of covering large portions of footwear with a display.

SUMMARY OF THE INVENTION

The object of the present invention is to provide a system for which footwear can be used to display designs. The system includes a display, control unit, power unit, input/output unit and memory. This allows the user to customize what is displayed on the footwear.

In one embodiment, the present invention allows a large portion, majority or all of the footwear surface to be able to display customized designs. This allows the user to not be limited to only small areas with low resolution or single LED lights of customization but rather large areas as well.

In another embodiment, the present invention can be used to allow the user to identify the color of a particular garment the user is wearing or intending to wear or a desired color from another article or object and then display the footwear with a color that is substantially the same color as the garment/article/object color. This allows the user to match the footwear to other articles of clothing or other objects.

The features, functions, and advantages of the present invention can be achieved independently in various embodiments of the present inventions or may be combined in yet other embodiments.

BRIEF DESCRIPTION OF THE FIGURES

The object, features and advantages of the present invention will become more apparent by describing the preferred embodiments with reference to the accompanying figures, in which.

Corresponding reference characters indicate corresponding parts throughout the drawings. The exemplification set of characters herein is not to be construed as limiting the scope of the invention in any manner.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

1. Definitions

The following terms used throughout the disclosure are defined as follows:

User—Any person, group or entity that uses the system or methods of the present invention;

Footwear—Any current or foreseeable future form of a foot covering garment, including by way of example boots, chukka boots, combat boots, cowboy boots, go-go boots, hiking boots, kinky boots, motorcycle boots, platform boots, riding boots, derby boots, thigh-length boots, ugg boots, valenki, waders, wellington boots, winkle pickers, shoes, athletic shoes, sneakers, cross-trainers, brothel creepers, diabetic shoes, espadrilles, galoshes, high heels, pumps, slippers, stiletto heels, kicks, kitten heels, lace-up shoes, derby shoes, oxford shoes, high-tops, brogues, loafers, penny loafers, mary janes, moccasins, monks, mules, platform shoes, school shoes, skate shoes, tap shoes, sandals, mandals, flip flops, slide, chaco, indoor footwear, slippers, ballet shoes, climbing shoes, clogs, foot thong, football boots, safety footwear, ski boots, snowshoes, cleats, surgical shoe, pointe shoes, swimfins, flippers and the like;

Content—Any text data, image data, color data, video data, sound data or any combination thereof;

Design—Particular set of content being presented on the display of the footwear;

Design files—Software files that store data and/or instructions used to define and display the design;

Display—Device or devices for showing pixels representing the design and is located over any area of the footwear;

Footwear Surface—All outwardly exposed surface area of the footwear that can be seen including by way of example top, bottom, front, back, sides, laces, tongues, straps, buckles, heels, soles and the like;

Electronic Computing Device—Any device used for processing data and having one or more processors, program logic, or other substrate configurations representing data and instructions, which operate as described herein. The processor can comprise controller circuitry, processor circuitry, processors, general purpose single-chip or multi-chip microprocessors, digital signal processors, embedded microprocessors, microcontrollers and the like. The devices can including by way of example a personal computer (PC), laptop, netbook, cellular phone, personal digital assistant (PDA), laptop computer, hand held computer, notebook, tablet PC, mobile telephone, Internet server, intranet server, mobile devices or the like.

2. Footwear

Figure 1A:
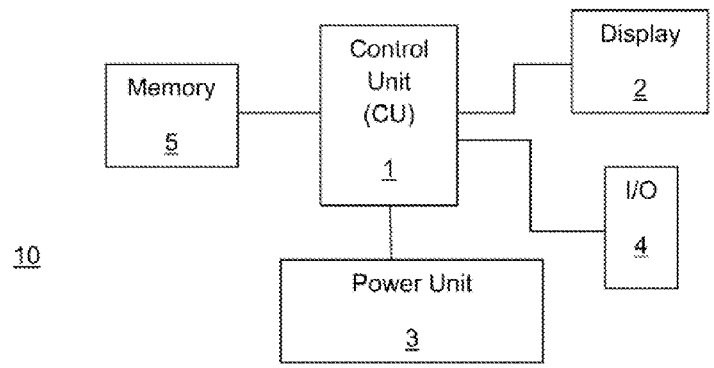
FIG. 1a illustrates a block diagram of the electronic components of the footwear in accordance with an embodiment of the present invention.

The footwear is constructed to have the necessary components for properly displaying the designs. FIG. 1a shows a block diagram of the system 10 of electronic components related to the footwear of the present invention. These electronic components include but are not limited to a control unit (CU) 1, display 2, power unit 3, input/output (I/O) unit 4, and memory 5.

The CU 1 of the footwear may include but is not limited to any processing circuitry used to execute instructions and to control some or all of the other components of the footwear including the I/O unit 4, memory 5, display 2, power unit 3, loudspeaker 6 and any other electronic components of the system. The CU 1 may comprise both memory and computational portions. The CU 1 can be any circuitry including by way of example: controller circuitry, processor circuitry, processors, general purpose single-chip or multi-chip microprocessors, digital signal processors, embedded microprocessors, microcontrollers and the like.

The power unit 3 of the system may be any power supply including by way of example batteries, solar cells, kinetic, power-over-ethernet (POE), power-over-wi-fi (POWF) or any other known power supply. In the case of kinetic, the motion and movement of the user's feet can be used to generate power for energizing the display 2 or recharging any battery attached thereto. In addition, the power unit 3 by itself or in conjunction with the CU 1 can be used to implement a power management scheme. The power management scheme may include powering down the display 2 when the footwear is detected to not be in use or putting the display 2 in a low-power or power saving mode. Power management can also be configured by the user.

The memory 5 of the footwear is used to store a variety of data including but not limited to any design file the user wishes to display, programs, operating systems, any overhead/processing data and any other data or instructions needed for the system to operate. The memory 5 can include any know memory type including by way of example static-state memory such as static-state-drives (SSD), flash memory, EEPROM, SRAM, DRAM, RAM, or any other memory device that does not require mechanically moving parts that are typically found hard drives. Modern day hard drives typically include moveable parts such as spinning platters/disks, read/write arms/heads and motors. Due to the motion of the user's feet memory devices having movable parts may be susceptible to errors. Therefore using a solid-state memory device alleviates this problem. In one embodiment, the memory can be integrated within the CU 1 itself and no additional memory circuitry needs to be present in the system. In another embodiment the memory can be any removable memory including by way of example SD, MMC, Mini SD, Micro SD, T-Flash, MS, M2 or the like. The size of the memory may vary between 64 megabytes through 20 gigabytes. FIG. 1d, shows an embodiment wherein the memory 5 is integrated within the CU 1.

The I/O unit 4 of the footwear may operate using any communication protocol including by way of example any wired or wireless protocol, IEEE 1394, Firewire, Universal Serial Bus (USB) 1.0 or higher, RS-232, Ethernet, Ultrawide Band (UWB), Zigbee, 60 GHz, Wi-fi, 802.11x (where x equals a,b,g,n, and the like), Bluetooth, Radio Frequency (RF), Infrared (IR), cellular telephone, IEEE 802.15.1, CDMA, TDMA, FDMA, wireless, or the like. The communications medium in which these protocols are implemented can be of any type including by way of example dedicated communication lines, telephone networks, wireless data transmission systems, two-way cable systems, customized computer networks, interactive kiosk networks, automatic teller machine networks, interactive television networks, and the like. In another embodiment, the I/O unit 4 may also be may be integrated within the CU 1 itself, as shown in FIG. 1e.

The display 2 of the footwear is any device that can produce a large number of pixels in order to display high resolution images or video. The display of the present invention may be of a single display or multiple displays that cover one or more portions of the footwear surface. The present invention is capable of supporting a plethora of resolutions in the range of about 50 pixels to 2 million pixels. In one embodiment the display can display about 500,000-1,000,000 pixels when a large portion of the footwear surface is to be covered. In another embodiment when the majority or substantially the entire footwear surface is covered, the display can display about 2,000,000 or more pixels. One important aspect of the invention is that the display 2 can be used over a large portion, a majority or substantially the entire footwear surface. The resolution or number of pixels in the display 2 will depend on a number of factors including by way of example the footwear surface area covered by the display, the native resolution of the display, the shape of the footwear, the user's desired resolution, the resolution of content in the design files to be displayed or any combination thereof. The native resolution is a parameter that indicates how many pixels the display actually has. If a user chooses a resolution that is different than the native resolution then the resolution will be converted or scaled to fit the native resolution. The size and shape of the display of the present invention will be indicative of the native resolution and will vary depending on the footwear type, size and footwear surface to be covered. The user can adjust the resolution of the design file being displayed so that it is higher or lower than the native resolution and the control unit will adaptively drive the display by converting or scaling to image with respect to the native resolution. For example, if display 2 has a native resolution of about 1 million pixels and the user wishes to display an image of the design file having about 500,000 pixels the CU 1 may up-convert the image to be displayed on the 1 million pixel display. The user may want to adjust the resolution to best match the particular resolution of an image in the design file to the native resolution of the display in order to get the best quality. For example, if the display covers substantially the entire footwear surface and has a native resolution of about 2 million pixels then the user may want to up-convert or down-convert the resolution to best display a particular image on the display. The system is flexible in what resolutions it can displayed and this resolution can be chosen by the user. In one embodiment, the surface area covered by the display 2 is greater than about 25% of the entire footwear surface. In another embodiment the surface area of the display 2 is between about 40% and 80% of the entire footwear surface. In another embodiment the display 2 may also cover up to substantially the entire footwear surface. The display 2 may be made of any known thin film display and will be covered by a coating or other protection methods known in the art to protect the display from weather, temperature, water, scratching and impact damage. In one embodiment, the display 2 may comprise any LED display including by way of example Organic Light Emitting Diode/Device/Display (OLED), Active Matrix Organic Light Emitting Diode (AMOLED), FOLED (Flexible Organic Light Emitting Diode), PhOLED (Phosphorescent Organic Light Emitting Diode, PLED (Polymer Light Emitting Diode, PMOLED (Passive Matrix OLED), POLED (Polymer Organic Light Emitting Diode), RCOLED (Resonant Color Organic Light Emitting Diode), SmOLED (Small Molecule Organic Light Emitting Diode, SOLED (Stacked Organic Light Emitting Diode), TOLED (Transparent Organic Light Emitting Diode), NOID (Neon Organic Iodine Diode) or the like.

According to FIG. 1 a, the user transfers design files using the I/O unit 4 and the files are stored in memory 5. The CU 1 executes a program that uses the design files stored in memory 5 in order to generate the content that will be shown on the display 2. The power unit 3 provides the power needed for each block to operate and may have an associated power management scheme.

Figure 1B:
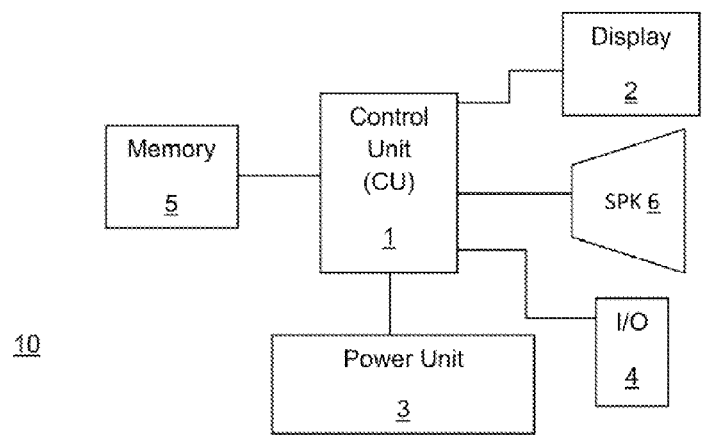
FIG. 1b illustrates an alternate block diagram of the electronic components of the footwear and includes a loudspeaker in accordance with an embodiment of the present invention.
Figure 1C:
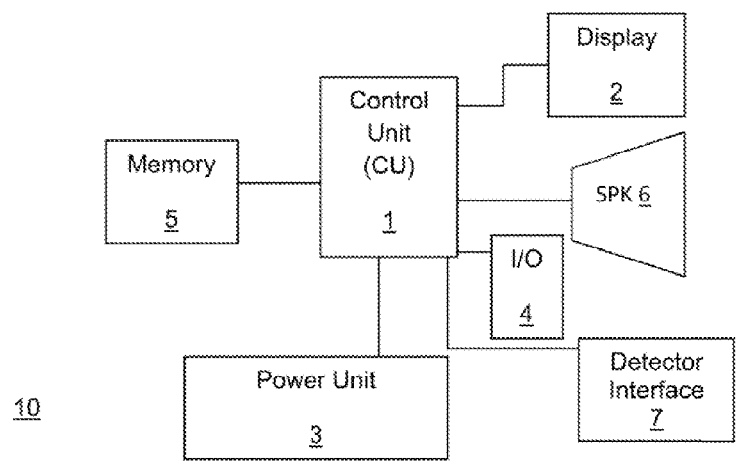
FIG. 1c illustrates an alternate block diagram of the electronic components of the footwear and includes a color detector interface in accordance with an embodiment of the present invention.
Figure 1D:
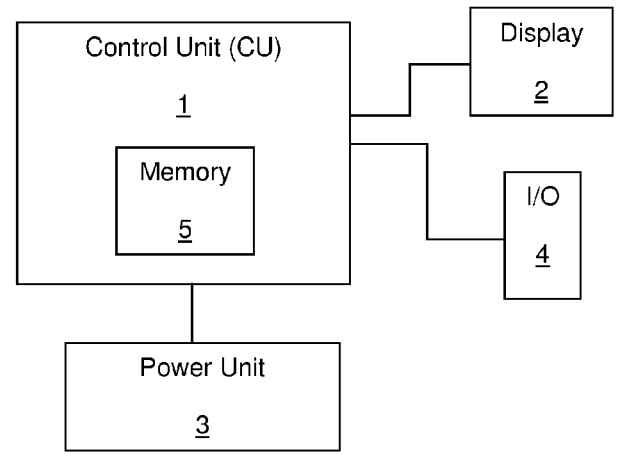
FIG. 1d illustrates an alternate block diagram of the electronic components of the footwear and includes integrated memory in accordance with an embodiment of the present invention.
Figure 1E:
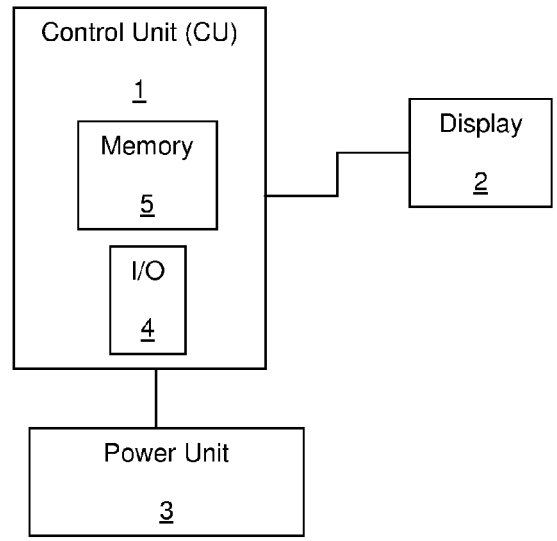
FIG. 1e illustrates an alternate block diagram of the electronic components of the footwear and includes both integrated memory and an integrated input/output unit in accordance with an embodiment of the present invention.

FIG. 1b, shows the optional loudspeaker 6, which is used to generate different audio signals. The audio signals processed by the CU 1 and generated may be from any audio format including by way of example HD Audio, MP3, WAV, AIFF, AU, WavPack, TAK, TTA, ATRAC, Vorbis, Musepack, ATRAC, WMA, AAC, PCM, RIFF, MIDI, BWF or the like. Furthermore, the audio signals can be custom designed by the user or may be any available existing audio including by way of example dialog, music, ring tones, movie soundtracks or the like. The audio signals may be set to be asynchronous or synchronous with respect to the images or video being displayed.

Some or all of the electronic components 1-7 may be integrated with the footwear itself, mounted on any surface of the footwear or may be located at a distance but communicatively coupled to the footwear. For electronic components of system 10 that are integrated within the footwear they may be hidden within any part of the footwear including by way of example the sole, tongue, heel or any other part of the footwear or combination thereof. In addition, all electronic components will be protected with moisture and temperature proofing techniques known in the art.

Figure 1F:
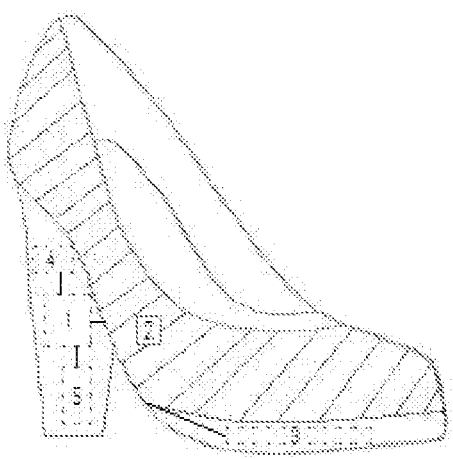
FIG. 1f illustrates one embodiment of the present invention having a configuration of the footwear with the electronic components in accordance with an embodiment of the present invention.

FIG. 1f shows a configuration whereby the CU 1, Power Unit 3, I/O Unit 4, and Memory 5 are integrated within the heel and sole of the footwear. These electronic components are designated by dashed-line boxes. The display 2 covers the entire area designated by the striped lines. The electronics in the footwear may be accessible through the use of an opening in the footwear so that the electronics can be upgraded or replaced if they become faulty. The heels and soles may also be completely sealed to protect from water and temperature and thus the components may not be readily accessible. The electronic component configuration of Figure if may exist in different configuration within the same type of shoe or may have the same or different configurations in other footwear types. In addition, the footwear may share some components such as the memory and control unit wherein only one of the footwear contains the control unit and memory and communicates content and instructions to the display of the other footwear of the pair.

Figure 1G:
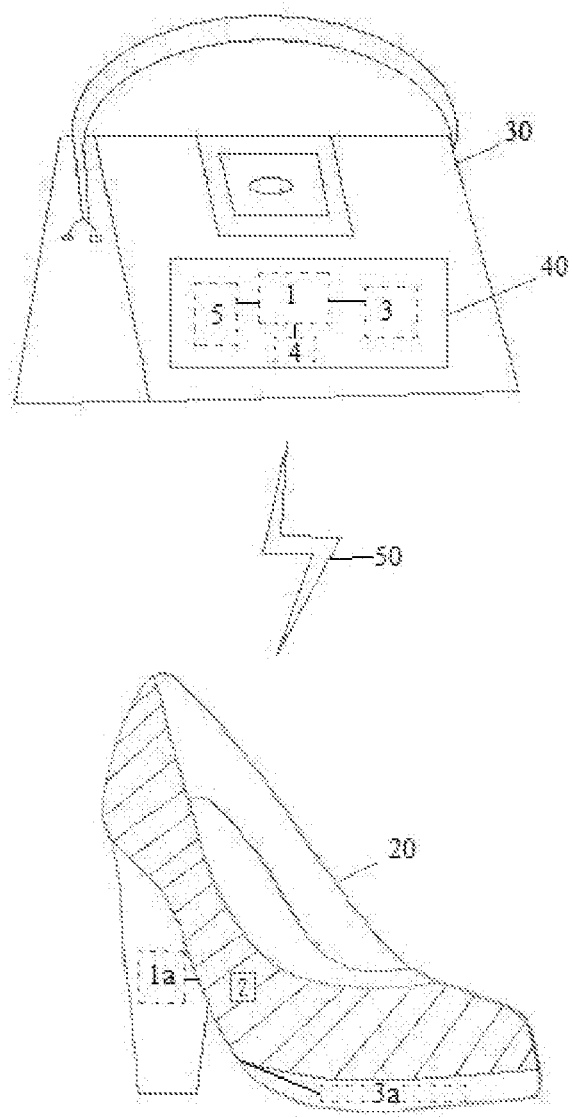
FIG. 1g illustrates alternate embodiment of the present invention having a configuration of the footwear with the electronic components in accordance with an embodiment of the present invention.

There may be situations where there is not enough internal room for all the electronic components or if the weight of the electronic components is too high. Some of the electronic components may be located at a distance from the footwear but communicatively coupled to the footwear. FIG. 1g shows an exemplary configuration whereby some of the electronic components are located at a distance from the footwear 20 but are communicatively coupled to the display of the footwear 20. In this exemplary configuration, the majority of the electronic components, CU 1, power unit 3, I/O unit 4 and memory 5, are located in a housing 40 that is located in a purse 30. The electronics located in the purse 30 communicate with the electronic components in the footwear 20 using communication protocol 50. Although protocol 50 is shown as a wireless protocol this protocol can be any known communication protocol using any known communications medium. The footwear 20 comprises the display 2 along with a complementary control unit 1a. Complementary control unit 1a may be the same type of control unit as CU 1 or any other type of control unit. The complementary control unit 1a may also have integrated within it an input/output unit (not shown) to communicate with the electronic components in purse 30 using the communication protocol 50. Alternatively, the input/output unit (not shown) may be external to the complementary control unit 1a and integrated into the footwear 20. The footwear 20 also includes a complementary power unit 3a that is used to power the display 2. The power unit 3 located in housing 40 is used to power the other electronic components that are also located in housing 40. During operation the electronic components in housing 40 would be used to transfer design files from for example an electronic computing device, a network such as the internet or from another user's footwear system. After transferring the design files, they are sent to the footwear 20 using communication protocol 50. The design files sent to the footwear 20 may be the same design files received by the electronic components in the purse 30 or may be complementary design files. Complementary design files received by the footwear may comprise instructions and/or content different from the design files received by the electronic components in the purse 30. In one embodiment, the complementary design files may have fewer instructions and/or have a different format then the design files received by the electronic components in the purse 30. The remote electrical components are not limited to placement in a purse but may be placed in any area that can be communicatively coupled to the footwear including by way of example in a sock, in a band to be wrapped around the leg, in a compact housing that can be placed in a pocket, in a necklace or other piece of jewelry, in a belt or belt buckle or the like.

Figure 2A:
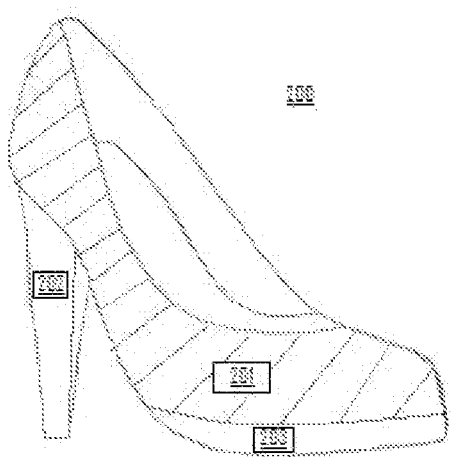
FIG. 2a illustrates footwear of the present invention wherein the display covers a certain portion of the footwear surface area in accordance with an embodiment of the present invention.
Figure 2B:
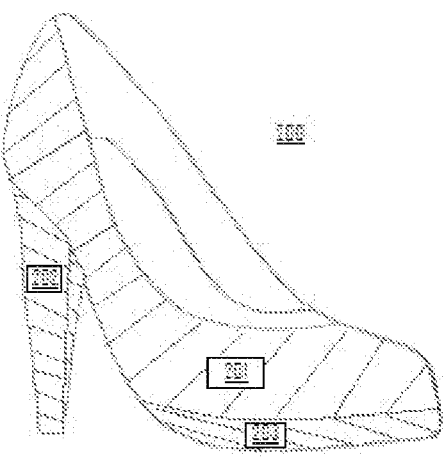
FIG. 2b illustrates alternate footwear of the present invention wherein the display covers a larger portion of the footwear surface area in accordance with an embodiment of the present invention.

FIGS. 2a and 2b show two exemplary configurations of the present invention. FIG. 2a shows footwear 200 having a plurality of sections 201-203. In this configuration the display of the present invention would cover the surface area denoted by section 201. Sections 202 and 203 do not include the display. The high-resolution design file would generate content that covers the entire section 201. Additionally, the other electronic components such as the CU, I/O Unit, power unit, memory and loudspeaker are hidden in the heel and/or sole of the footwear. FIG. 2b shows another configuration wherein the display covers the areas denoted by 201, 202 and 203. The user can customize the design displayed in any of these sections. The design areas cover a large portion of the surface of the footwear. In the configuration of FIG. 2b, areas 201-203 may be the same display image or may display different display images. In addition, in the configuration of FIG. 2b, areas 201-203 may be of a single display or multiple displays.

3. Designs

Designs that are to be displayed by the user can be created by the users themselves using any existing software program including for example Adobe Photoshop, Adobe Illustrator, Microsoft Paint, or the like. Additionally, the user may use proprietary software program that is provided or associated with the footwear of the present invention. This proprietary software program may be provided to the user using any form of software delivery including for example hard copy, compact disc (CD), flash drive, downloadable form, Internet based, or the like. Further, the software program may advantageously be implemented as one or more modules. The modules may advantageously be configured to execute on one or more processors. The modules may comprise, but are not limited to, any of the following: software or hardware components such as software object-oriented software components, class components and task components, processes methods, functions, attributes, procedures, subroutines, segments of program code, drivers, firmware, microcode, circuitry, data, databases, data structures, tables, arrays, variables, or the like.

The user may obtain designs from the Internet on a free and/or fee basis. Internet designs may be created by the user using either a desktop-based interface or a web-based interface and transferred, using either the desktop interface or web-based interface, to a server for later retrieval or the designs can be created by other users and obtained by the current user. The software used for the design may be located on any electronic computing device. The software may also be located and executed using the footwear itself. As mentioned earlier, the designs can be completely customized to display high-resolution images, high-resolution video and/or large color depth pixels representing a single or variety of colors or patterns. In one embodiment the design can be video and the display frequency can range from about 15 frames-per-second to about 120 frames-per-second or about 15 Hz to about 120 Hz. In another embodiment the display frequency is 60 frames-per-second or 60 Hz. In one embodiment the color depth is between about 8-bits and 48-bits. This range will allow the user to select or detect a large gamut of colors. In another embodiment the color depth is 24-bits which would provide true color which is able to produce over 16.7 million distinct colors. Of the 24-bits in true color, 8 bits represent red, another 8 bits represent green and the last 8 bits represent blue. In another embodiment the color depth may be 36 bits or 48 bits or more which will allow the user to display high-end graphics.

In another embodiment, a user may wish to have some or all of the pixel colors match substantially the same color as another object. For instance, if the user is wearing a suit that is of a certain shade of gray, then the user might want some or all of the pixels to be substantially the same color in the user's footwear display. The user selects a color that is substantially the same as the color of the suit using software by choosing colors or color coordinates from a large collection of different colors already stored in the software. In addition, the present invention also includes a color detector that can automatically detect the color of the suit and automatically determine the corresponding color coordinates. The color coordinates may be any known color coordinates including for example RGB, HTML Hex, YBR or the like. Based on the determined color coordinates the design to be displayed may include all or some of the pixels having the same color coordinates or at a desired different shade of the color coordinates, thereby providing substantially the same color in the display as the user's other article of clothing. In one embodiment, 'substantially the same color' refers to a color that is so closely identical to the color of the other article of clothing that a human eye cannot tell the difference in the color or 'substantially the same color' may also refer to a color wherein the human eye can see a difference but the color difference is negligible, acceptable or actually wanted by the user. Thus, using the same footwear the user can match the color being displayed by the footwear display to any other article of clothing in the user's wardrobe rather than requiring separate footwear for each article of clothing. The user can also select to have the detected color displayed in substantially all the pixels of the display or a portion thereof. Other objects the detector can be used to detect the color of are different body parts in cases where the user wishes to match the footwear color to these body parts. The body parts may any body parts including by way of example skin, eyes, hair, toe nails, finger nails, or the like. The detector can also detect patterns and/or multiple colors. The footwear can match the pattern of another object. Further, a user can use the detected colors from the detector to create a pattern or other image to be displayed on the footwear. Another application of the present invention may be for soldiers or other military personnel who operate in different geographical environments, thereby requiring different camouflage colors. The present invention would allow those military personnel to use the same footwear for each of those different environments.

Figure 3A:
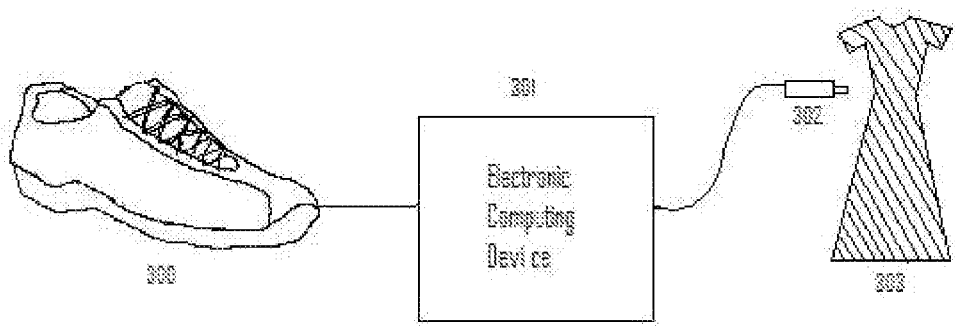
FIG. 3a illustrates a configuration for using a color detection device with the footwear in accordance with an embodiment of the present invention.
Figure 3B:
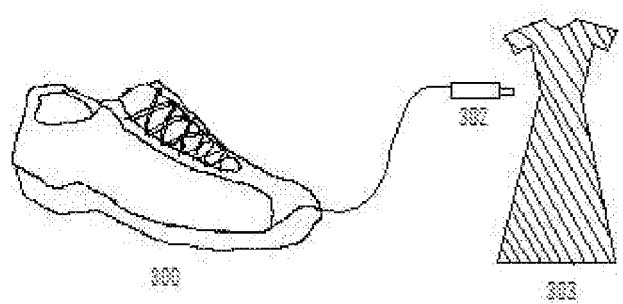
FIG. 3b illustrates an alternate configuration for using a color detection device with the footwear in accordance with an embodiment of the present invention.

FIGS. 3a & 3b show the use of the color detector feature of the present invention. FIG. 3a includes the footwear 300 of the present invention coupled to an electronic computing device 301. In this configuration, the electronic computing device 301 stores and executes a program that determines the color of garment 303. The user uses a color detection device 302 to sense the color of the garment 303. The color values are processed by electronic computing device 301 to determine color values that represent substantially the same color as that of the garment 303 and these values are sent to the footwear 300 in a design file. The footwear 300 uses this design file to generate pixel colors that have substantially the same color as the colors of the garment 303. FIG. 3b, shows a configuration wherein the color detection device 302 is coupled directly to the footwear 300, using the I/O unit of the footwear and without any intervening electronic computing device. In this configuration, the control unit of the footwear 300 stores and executing the program used to determine the color values of the garment 303. The control unit of the footwear 300 would then create the design file itself and execute the program to display pixels colors that are substantially the same color as the garment 303. In addition, from FIG. 3b, the user can transfer the design files made using the color detection device 302 and the control unit to a different electronic computing device for further editing of the design by the user. After redesigning the design files the user can transfer them back to the footwear and or share them with other users for free or for a fee.

In another embodiment, the designs of the present invention can be used for sales and marketing promotions. Since the present invention allows for high-resolution images, video and/or audio, the user can display by way of example a logo, company name, advertisement or any other promotional content of a company or other organization in the display. One application may be for a user that is an athlete or celebrity wherein their footwear may be viewed by a large number of people (i.e. on the putting green in golf, line of scrimmage in football, foul line in basketball, runway in a fashion show, etc.). The user can agree to display the promotional content for free or for a fee. The design process can allow for the display to remain for any amount of time and may consist of a single promotion, multiple promotions simultaneously, multiple promotions sequentially, and any combination thereof. The fee structure may include any fee structure known in the art including but not limited to pay-per-display, pay-per-minute or auction-based.

Figure 4:
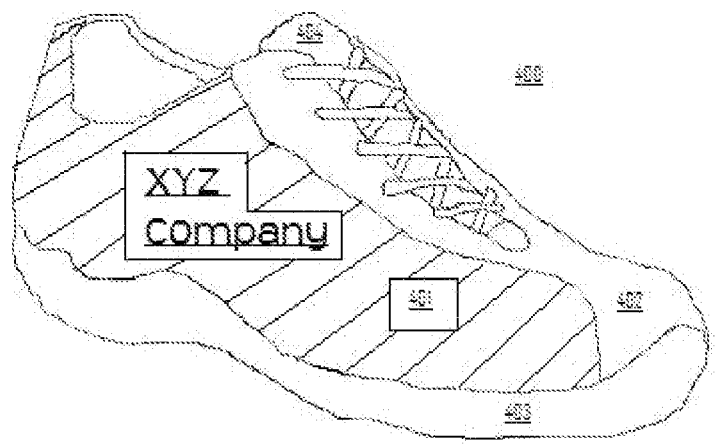
FIG. 4 illustrates a configuration of using the display to show promotional content in accordance with an embodiment of the present invention.

FIG. 4 shows footwear 400 of the present invention wherein the footwear is used to display promotional material for a company, XYZ Company. In this configuration the display fills the surface area of the footwear in section 401 and shows the company's name. Alternatively, the remaining sections 402-404 may also be covered by the display and show additional content.

Figure 5A:
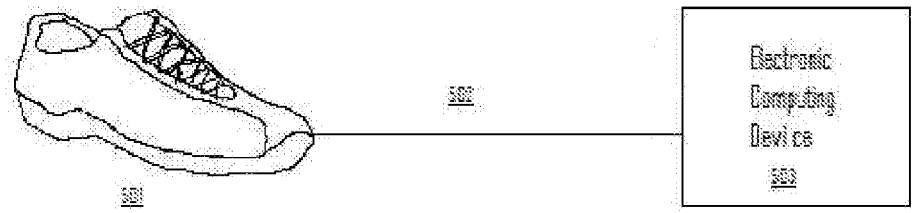
FIG. 5a illustrates a configuration for transferring design files to and from the footwear in accordance with an embodiment of the present invention.
Figure 5B:
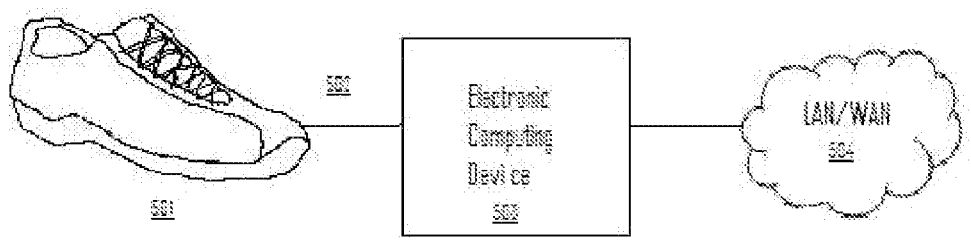
FIG. 5b illustrates an alternate configuration for transferring design files to and from the footwear in accordance with an embodiment of the present invention.
Figure 5C:
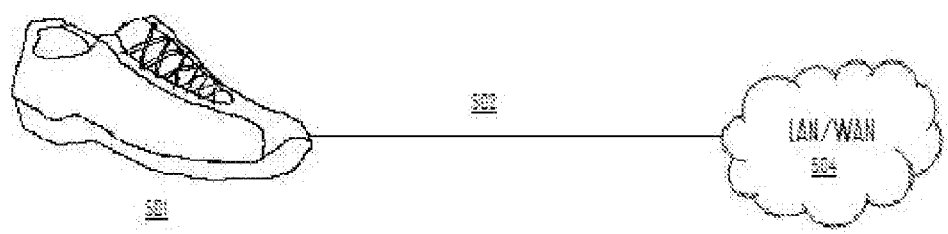
FIG. 5c illustrates an alternate configuration for transferring design files to and from the footwear in accordance with an embodiment of the present invention.
Figure 5D:
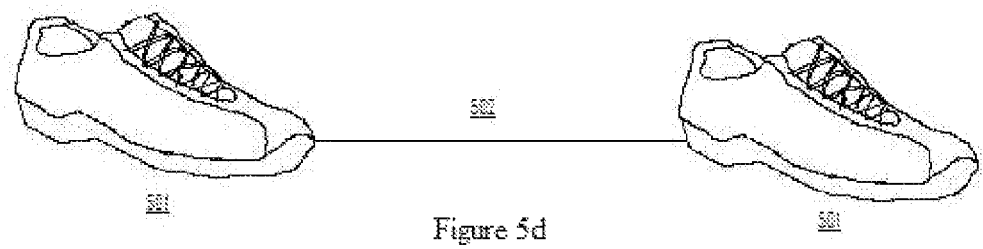
FIG. 5d illustrates an alternate configuration for transferring design files to and from the footwear in accordance with an embodiment of the present invention.

FIGS. 5a-5d show different configurations for communicating design files and any other data to and from the footwear of the present invention. FIG. 5a shows a configuration wherein the footwear 501 is coupled to an electronic computing device 503 and the user transfers the design files already stored on the electronic computing device 503 to the footwear using interconnect 502. Interconnect 502 is connected to the I/O unit of the footwear 501 and may communicate using any wired or wireless protocol including but is not limited to IEEE 1394, Firewire, Universal Serial Bus (USB) 1.0 or higher, RS-232, Ethernet, Ultrawide Band (UWB), Zigbee, 60 GHz, Wi-fi, 802.11x (where x equals a,b,g,n, etc.), PSTN, Bluetooth, Radio Frequency (RF), Infrared (IR), cellular telephone, IEEE 802.15.1, CDMA, TDMA, FDMA, wireless, or any other proprietary or non-proprietary communication protocol. FIG. 5b shows a configuration wherein the user first transfers the design files from a LAN/WAN 504, such as the Internet or some other network, to the electronic computing device 503 and then transfers the design files from the electronic computing device 503 to the footwear 501. FIG. 5c shows a configuration wherein the design files are directly transferred from the LAN/WAN 504 to the footwear 501. FIG. 5d, shows a configuration wherein designs are communicated directly between two different pieces of footwear 501. In the case shown in FIG. 5d, each of the two pieces of footwear 501 may be owned by the same user or a different user, thus allowing for sharing of designs.

Sharing designs amongst users can be beneficial in that if one user likes the design of another user, then each of the users can communicate one or more design files directly between their footwear without the need of in intervening network or electronic computing device. This can be done using the I/O units of each piece of footwear. The user can select to immediately display the communicated one or more design files or save it in the footwear to display later or transfer the saved one or more design files to an electronic computing device at a later time. The present invention may also include actuators located on the footwear to commence design file transfer between the footwear and any other footwear, any electronic computing device or any WAN/LAN, wherein the actuators may includes any actuator including by way of example soft keys, touch screen, hard keys, a remote/handheld control or the like. Alternatively, commencement of the design file transfer may take place automatically or without any intervention by the user. Additionally, commencement of the file transfer may also take place through the use of a user interface of an electronic computing device that is in communication with the user's footwear, thus providing an interface for entering design file transfer commands. The interface is any interface including by example voice activated commands, Graphical User Interface (GUI), menus and the like. Commencement of the design file transfer can take place using the electronic computing device.

Figure 6:
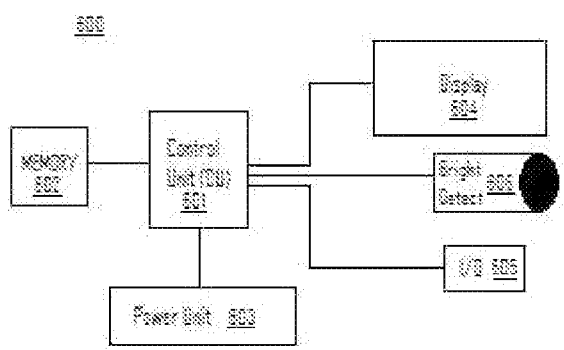
FIG. 6 illustrates a configuration of using a brightness detector with the footwear in accordance with an embodiment of the present invention.

The display of the designs can also be altered in a plurality of ways. The display can be programmed to display different designs according to any different number of metrics or combinations of metrics including by way of example different times of day, cyclically at a particular rate, different temperatures, different rates of motion of the user's feet, the level of light in the surrounding environment or the like. Another use for the present invention is to activate the display with high luminance/brightness when the footwear senses the user in is a dark environment to thereby aid the user in movement (i.e. walking in a dark room) or to make the user more visible to others (i.e. jogging at night). FIG. 6, shows a configuration wherein the electrical components of the footwear 600 also include a brightness detector 606. In this configuration the CU 601 uses the brightness detector 606 to determine if the brightness level is below a certain threshold that would indicate the footwear 600 and user are in a dark environment. When such a condition exists the CU 601 can light display 604 with high luminance/brightness so that the user of the footwear 600 can see in the surrounding environment.

Although the above descriptions include having the electronic components of the system integrated with the footwear, the system can also be implemented as a retrofit solution wherein the user has existing footwear and wishes to add the customization aspect of the present invention. In this instance, the user will attach the display to the existing footwear along with the corresponding electronic components.

Figure 7A:
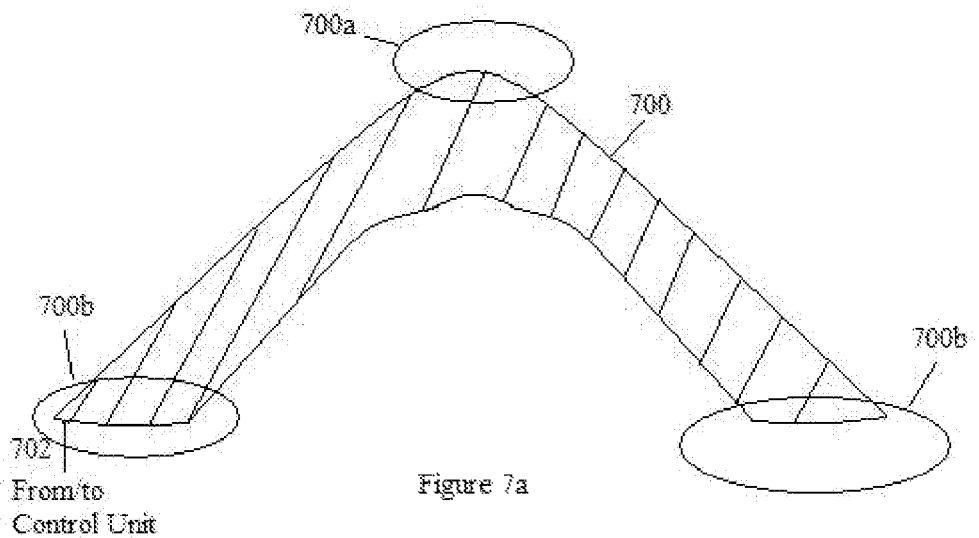
FIG. 7a illustrates a top view of a retrofitting version of the in accordance with an embodiment of the present invention.
Figure 7B:
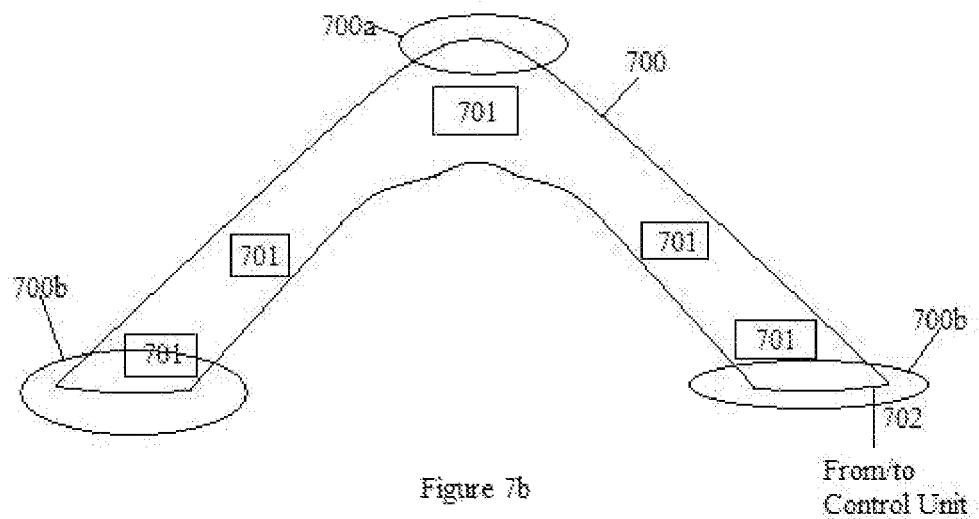
FIG. 7b illustrates a bottom view of a retrofitting version of the display in accordance with an embodiment of the present invention.
Figure 7C:
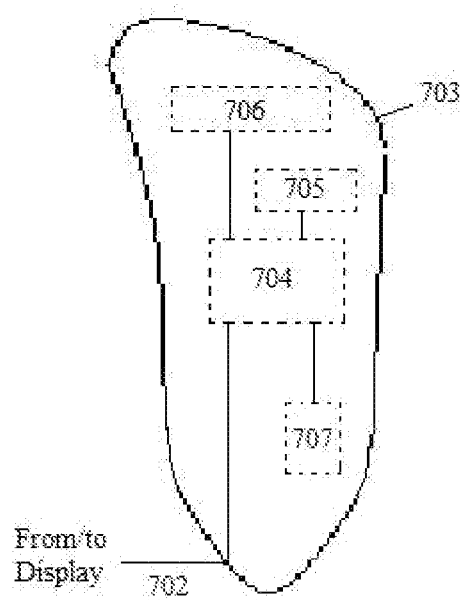
FIG. 7c illustrates a top view of a retrofitting footwear sole insert having the electronic components in accordance with an embodiment of the present invention.
Figure 7D:
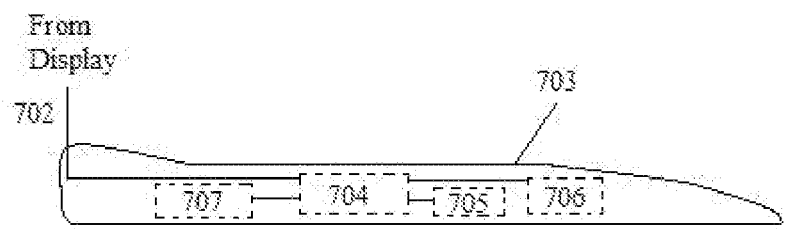
FIG. 7d illustrates a side view of a retrofitting footwear sole insert having the electronic components in accordance with an embodiment of the present invention.

FIGS. 7a-7d show another embodiment of the present invention. FIG. 7a shows a top view of a display 700 for footwear similar to that shown in FIG. 2a. Front circle 700a indicates the front of the display 700 that would be located toward the front or toes area of the footwear. Rear circles 700b indicate the back of the display 700 that would be located toward the back or heel area of the footwear. Since the display 700 is made of flexible material the user can wrap the display 700 around the existing footwear. When wrapped around the existing footwear the back of the display 700 would meet at rear circles 700b. FIG. 7b shows a bottom view of the display 700 of FIG. 7a. The bottom of display 700 includes attachment means 701 using to attach the display to the existing footwear. Attaching means 701 can be any means for attaching the display to the existing footwear including by way of example Velcro©, snapping buttons, tongue & groove, glue, tape, adhesive, stitching or any other known means. FIGS. 7a & 7b also include connector 702. Connector 702 couples the display 700 to a control unit 704 that is shown in FIGS. 7c & 7d.

FIG. 7c is a top view of the electronic components being embedded into a footwear sole insert 703. The electronic components include by way of example control unit 704, memory 705, power unit 706 and I/O unit 707. The user inserts the footwear sole insert 703 into the existing footwear and connects it to the display using connector 702. When connected, the display 700 and electronic components in the footwear sole insert 703 operate in the same fashion as described in the other embodiments of the present invention. Although the electronic components are shown as being located in the footwear sole insert 703 they may also be located in any other locations of the existing footwear, integrated into a different type of insert or communicatively coupled to the display 700. FIG. 7d is a side view of the footwear sole insert 703 shown in FIG. 7d. Further, the electronics can be located in the sole of the existing footwear itself.

Figure 8:
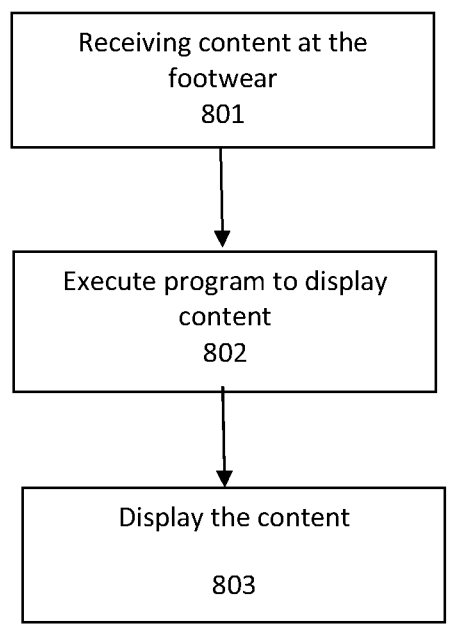
FIG. 8 illustrates a flow diagram of operations performed by one embodiment of the present invention.

FIG. 8 demonstrates operations performed in accordance with the present invention. In operation 801 the I/O unit of the footwear receives content that is to be displayed. In operation 802 the CU executes instructions (program) to display the content. In operation 803 the display in communication with the CU shows the content.

Figure 9:
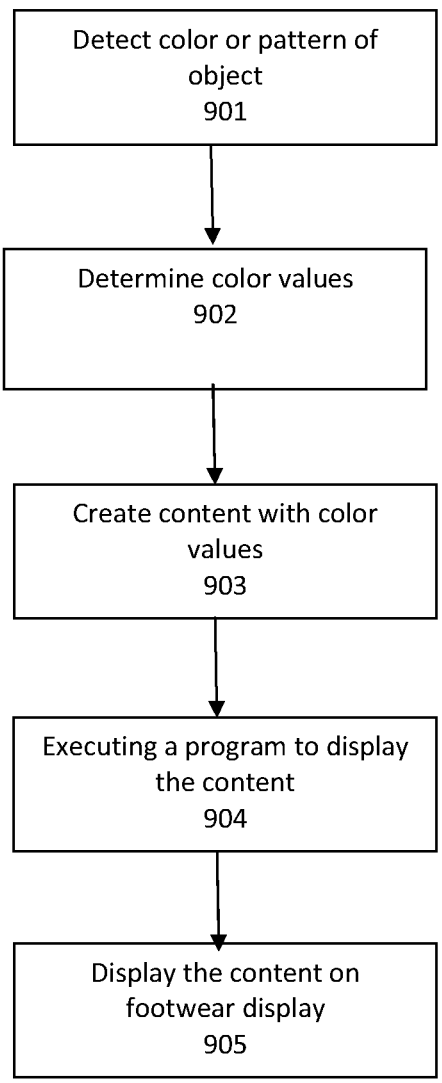
FIG. 9 illustrates a flow diagram of operations performed by another embodiment of the present invention.

FIG. 9 also demonstrates operations performed in one embodiment including a color detector in accordance with the present invention. In operation 901 detection of a color or pattern of an object is made by the user or a detector device. In operation 902 a determination of the color values of the object are made. This determination can be made by the user visually inspecting the object and choosing a color from a color gamut presented to the user in software or the user can use a detector that can automatically detect and determine the color values. Based on the detection a color that is substantially the same color as the object is determined. In operation 903 the content is created wherein some or all of the pixels use the detected color or pattern. In operation 904, the CU executes a program to display the content on the display of the footwear. In operation 905 the display in communication with the CU shows the content.

Although specific embodiments of the present invention have been illustrated and described herein, it will be appreciated by those of ordinary skill in the art that any arrangement which is calculated to achieve the same purpose may be substituted for the specific embodiments shown. In addition, although the above invention is demonstrated as a software based implementation, the invention could be implemented as software, hardware, or any combination foreseeable to one of ordinary skill in the art. This application is intended to cover any adaptations or variations within the spirit of the invention.

What is claimed is:

1. A system for advertising on footwear, comprising:
   displaying promotional content on an electronic display of the footwear;
   wherein the promotional content being displayed occupies 25% to 100% of the outer surface of the footwear; and
   wherein the promotional content comprises a single promotion, multiple promotions simultaneously, multiple promotions sequentially, or any combination thereof.

2. A system for advertising on footwear, comprising:
   displaying promotional content on an electronic display of the footwear;
   wherein the promotional content being displayed occupies 25% to 100% of the outer surface of the footwear; and
   wherein the step of displaying the promotional content further comprises displaying the promotional content for free or for a fee.

3. A system for advertising on footwear, comprising:
displaying promotional content on an electronic display of the footwear;
wherein the promotional content being displayed occupies 25% to 100% of the outer surface of the footwear; and
wherein a user of the footwear comprises an athlete, a fashion show runway model, a celebrity or any combination thereof.

4. A system for advertising on footwear, comprising:
displaying promotional content on an electronic display of the footwear;
wherein the promotional content being displayed occupies 25% to 100% of the outer surface of the footwear;
wherein the step of displaying the promotional further comprises displaying the promotional content according to at least one condition; and wherein the at least one condition comprises a time of day, a desired cyclical display rate, one or more particular temperatures or range of temperatures, the rate of motion of the footwear, the level of light in the surrounding environment or any combination thereof.

5. A system for advertising on footwear, comprising:
displaying promotional content on an electronic display of the footwear;
wherein the promotional content being displayed occupies 25% to 100% of the outer surface of the footwear; and
wherein the step of displaying further comprises displaying the promotional content using a number of pixels, wherein the number of pixels is of between 50 to 2,000,000 pixels.

6. A system for advertising on footwear, comprising:
displaying promotional content on an electronic display of the footwear;
wherein the promotional content being displayed occupies 25% to 100% of the outer surface of the footwear; and
wherein the step of displaying further comprises displaying the promotional content using a particular color depth, wherein the color depth is of between 8-bits to 48-bits.

7. A system for advertising on footwear, comprising:
displaying promotional content on an electronic display of the footwear;
wherein the promotional content being displayed occupies 25% to 100% of the outer surface of the footwear; and
wherein the step of displaying further comprises displaying the promotional content at frequency, wherein the frequency is of between 15 frames-per-second to 120 frames-per-second.

8. A system for advertising on footwear, comprising:
displaying promotional content on an electronic display of the footwear;
wherein the promotional content being displayed occupies 25% to 100% of the outer surface of the footwear; and
wherein the promotional content consists of text data, image data, color data, video data, sound data or any combination thereof.

9. The system as in any one of claims 1, 2, 3, 4, 5, 6, 7 and 8,
wherein the display is flexible and bends with the outer contour of the footwear.

10. The system as in any one of claims 1, 2, 3, 4, 5, 6, 7 and 8, wherein the display is flexible and wraps around along a contour of the footwear.

11. The system as in any one of claims 1, 2, 3, 4, 5, 6, 7 and 8, wherein the outer surface of the footwear consists of a top, bottom, front, back, sides, laces, tongues, straps, buckles, heels, soles or any combination thereof.

12. The system as in any one of claims 1, 2, 3, 4, 5, 6, 7 and 8,
wherein the display is a thin film display that consists of one of the following: Organic Light Emitting Diode/Device/Display (OLED), Active Matrix Organic Light Emitting Diode (AMOLED), FOLED (Flexible Organic Light Emitting Diode), PhOLED (Phosphorescent Organic Light Emitting Diode, PLED (Polymer Light Emitting Diode, PMOLED (Passive Matrix OLED), POLED (Polymer Organic Light Emitting Diode), RCOLED (Resonant Color Organic Light Emitting Diode), SmOLED (Small Molecule Organic Light Emitting Diode, SOLED (Stacked Organic Light Emitting Diode), TOLED (Transparent Organic Light Emitting Diode) and NOID (Neon Organic Iodine Diode); and wherein the footwear consists of at least one of the following: boots, chukka boots, combat boots, cowboy boots, go-go boots, hiking boots, kinky boots, motorcycle boots, platform boots, riding boots, derby boots, thigh-length boots, ugg boots, valenki, waders, wellington boots, winkle pickers, shoes, athletic shoes, sneakers, cross-trainers, brothel creepers, diabetic shoes, espadrilles, galoshes, high heels, pumps, slippers, stiletto heels, kicks, kitten heels, lace-up shoes, derby shoes, oxford shoes, high-tops, brogues, loafers, penny loafers, mary janes, moccasins, monks, mules, platform shoes, school shoes, skate shoes, tap shoes, sandals, mandals, flip flops, slide, chaco, indoor footwear, slippers, ballet shoes, climbing shoes, clogs, foot thong, football boots, safety footwear, ski boots, snowshoes, cleats, surgical shoe, pointe shoes, swimfins, and flippers.

13. A system for advertising on footwear, comprising:
displaying promotional content on an electronic display of the footwear;
wherein the promotional content being displayed occupies 25% to 100% of the outer surface of the footwear; and
wherein the electronic display is a thin film display and wherein the electronic display is retrofitted into existing footwear.

14. A method for displaying promotional content on footwear having a footwear surface, comprising:
Receiving the promotional content at the footwear;
Executing a program by a control unit of the footwear to display the promotional content;
Displaying the promotional content on a display of the footwear;
wherein the step of displaying further comprises displaying the content on 25% to 100% of the outer surface of the footwear; and
wherein the promotional content comprises a single promotion, multiple promotions simultaneously, multiple promotions sequentially, or any combination thereof.

15. A method for displaying promotional content on footwear having a footwear surface, comprising:
Receiving the promotional content at the footwear;
Executing a program by a control unit of the footwear to display the promotional content;
Displaying the promotional content on a display of the footwear;
wherein the step of displaying further comprises displaying the content on 25% to 100% of the outer surface of the footwear; and
wherein the step of displaying the promotional content further comprises displaying the promotional content for free or for a fee.

16. A method for displaying promotional content on footwear having a footwear surface, comprising:
- Receiving the promotional content at the footwear;
- Executing a program by a control unit of the footwear to display the promotional content;
- Displaying the promotional content on a display of the footwear;
- wherein the step of displaying further comprises displaying the content on 25% to 100% of the outer surface of the footwear; and
- wherein the promotional content consists of text data, image data, color data, video data, sound data or any combination thereof.

17. The method as in any one of claims 14, 15 and 16, wherein the display is flexible and bends with the outer contour of the footwear.

18. The method as in any one of claims 14, 15 and 16, wherein the display is flexible and wraps around along a contour of the footwear.

19. The method as in any one of claims 14, 15 and 16, wherein the outer surface of the footwear consists of a top, bottom, front, back, sides, laces, tongues, straps, buckles, heels, soles or any combination thereof.

20. The method as in any one of claims 14, 15 and 16, wherein the display is a thin film display that consists of one of the following: Organic Light Emitting Diode/Device/Display (OLED), Active Matrix Organic Light Emitting Diode (AMOLED), FOLED (Flexible Organic Light Emitting Diode), PhOLED (Phosphorescent Organic Light Emitting Diode, PLED (Polymer Light Emitting Diode, PMOLED (Passive Matrix OLED), POLED (Polymer Organic Light Emitting Diode), RCOLED (Resonant Color Organic Light Emitting Diode), SmOLED (Small Molecule Organic Light Emitting Diode, SOLED (Stacked Organic Light Emitting Diode), TOLED (Transparent Organic Light Emitting Diode) and NOID (Neon Organic Iodine Diode); and wherein the footwear consists of at least one of the following: boots, chukka boots, combat boots, cowboy boots, go-go boots, hiking boots, kinky boots, motorcycle boots, platform boots, riding boots, derby boots, thigh-length boots, ugg boots, valenki, waders, wellington boots, winkle pickers, shoes, athletic shoes, sneakers, cross-trainers, brothel creepers, diabetic shoes, espadrilles, galoshes, high heels, pumps, slippers, stiletto heels, kicks, kitten heels, lace-up shoes, derby shoes, oxford shoes, high-tops, brogues, loafers, penny loafers, mary janes, moccasins, monks, mules, platform shoes, school shoes, skate shoes, tap shoes, sandals, mandals, flip flops, slide, chaco, indoor footwear, slippers, ballet shoes, climbing shoes, clogs, foot thong, football boots, safety footwear, ski boots, snowshoes, cleats, surgical shoe, pointe shoes, swim-fins, and flippers.

\* \* \* \* \*